(12) United States Patent
Koifman

(10) Patent No.: US 12,495,227 B2
(45) Date of Patent: Dec. 9, 2025

(54) FOUR-TRANSISTOR PIXEL WITH CHARGE SHARING

(71) Applicant: Apple Inc., Cupertino, CA (US)

(72) Inventor: Vladimir Koifman, Rishon Lezion (IL)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 18/616,231

(22) Filed: Mar. 26, 2024

(65) Prior Publication Data

US 2025/0024175 A1    Jan. 16, 2025

Related U.S. Application Data

(60) Provisional application No. 63/513,886, filed on Jul. 16, 2023.

(51) Int. Cl.
| | |
|---|---|
| *H04N 25/771* | (2023.01) |
| *H04N 25/59* | (2023.01) |
| *H04N 25/616* | (2023.01) |

(52) U.S. Cl.
CPC .......... *H04N 25/771* (2023.01); *H04N 25/59* (2023.01); *H04N 25/616* (2023.01)

(58) Field of Classification Search
CPC ..... H04N 25/771; H04N 25/59; H04N 25/616
See application file for complete search history.

(56) References Cited

U.S. PATENT DOCUMENTS

| | | | |
|---|---|---|---|
| 5,144,442 A | 9/1992 | Ginossar et al. | |
| 6,570,617 B2 | 5/2003 | Fossum et al. | |
| 6,933,488 B2 * | 8/2005 | Pain | H10F 39/8057 348/308 |
| 8,169,517 B2 | 5/2012 | Poonnen et al. | |

(Continued)

FOREIGN PATENT DOCUMENTS

| | | |
|---|---|---|
| DE | 102021209943 A1 | 3/2022 |
| EP | 2123019 B1 | 9/2019 |

(Continued)

OTHER PUBLICATIONS

Shukri, "Apple's Newest iPhone Three Camera System is "Campacked"," Image Sensors Technology, TechInsights Inc., pp. 1-10, year 2023.

(Continued)

*Primary Examiner* — Nicholas G Giles
(74) *Attorney, Agent, or Firm* — Meitar Patents LTD.; Daniel Kligler

(57) ABSTRACT

An image sensor includes a pixel-circuit and circuitry. The pixel-circuit includes a PD that accumulates charge responsively to incident light and a FD that stores the charge. The circuitry serially (i) connects the PD and a supply rail to the FD and sends a first FD voltage, (ii) disconnects the supply rail from the FD and sends a second FD voltage, (iii) disconnects the PD from the FD and sends a third FD voltage, (iv) waits a preset exposure time, (v) connects the supply rail to the FD and sends a fourth FD voltage, (vi) disconnects the supply rail from the FD and sends a fifth FD voltage, and (vii) connects the PD to the FD and sends a sixth FD voltage. The circuitry estimates incident light energy responsively to (i) the FD voltages, and (ii) a capacitance ratio defined over at least capacitances of the FD and the PD.

14 Claims, 7 Drawing Sheets

(56) References Cited

U.S. PATENT DOCUMENTS

| | | | |
|---|---|---|---|
| 8,587,706 B2 * | 11/2013 | Bechtel | H04N 25/531 |
| | | | 348/308 |
| 8,606,009 B2 | 12/2013 | Sun | |
| 9,344,635 B2 | 5/2016 | Vogelsang et al. | |
| 9,571,774 B2 | 2/2017 | Koifman et al. | |
| 10,250,832 B1 | 4/2019 | Xu et al. | |
| 10,798,322 B2 | 10/2020 | Smith et al. | |
| 10,859,434 B2 | 12/2020 | Panicacci | |
| 11,336,860 B2 | 5/2022 | Yonemoto | |
| 12,279,055 B2 | 4/2025 | Koifman | |
| 2002/0047086 A1 * | 4/2002 | Pain | H04N 25/625 |
| | | | 348/E3.021 |
| 2009/0190015 A1 * | 7/2009 | Bechtel | H04N 25/57 |
| | | | 348/E5.091 |
| 2014/0159702 A1 | 6/2014 | Doege | |
| 2016/0240572 A1 | 8/2016 | Koifman et al. | |
| 2016/0269661 A1 | 9/2016 | Hseih et al. | |
| 2017/0118430 A1 | 4/2017 | Koifman et al. | |
| 2018/0227516 A1 | 8/2018 | Mo et al. | |
| 2018/0227523 A1 | 8/2018 | Mo et al. | |
| 2020/0382726 A1 | 12/2020 | Inaoka et al. | |
| 2023/0011827 A1 | 1/2023 | Cho et al. | |
| 2024/0089623 A1 | 3/2024 | Koifman | |
| 2024/0098386 A1 | 3/2024 | Koifman | |
| 2025/0024170 A1 | 1/2025 | Panicacci et al. | |

FOREIGN PATENT DOCUMENTS

| | | |
|---|---|---|
| KR | 20200098764 A | 8/2020 |
| WO | 2023018841 A9 | 2/2023 |

OTHER PUBLICATIONS

Spivak et al., "Wide-Dynamic-Range CMOS Imaging Devices—Comparative Performance Analysis", IEEE Transactions on Electron Devices, vol. 56, No. 11, pp. 2446-2461, Nov. 2009.

Wikipedia, "Internet of Things (IOT)," pp. 1-53, latest edit Apr. 18, 2023.

Robidoux et al., "End-to-end High Dynamic Range Camera Pipeline Optimization," Conference Paper, Conference on Computer Vision and Pattern Recognition (CVPR) 2021, pp. 1-11, year 2021.

Ernst et al., "HDR+ with Bracketing on PixelPhones," Blog, Google Research, pp. 1-8, Apr. 23, 2021, as downloaded from as downloaded from https://blog.research.google/2021/04/hdr-with-bracketing-on-pixel-phones.html.

Theuwissen, "CMOS Image Sensors: State-of-the-Art," Solid-State Electronics, vol. 52, pp. 1401-1406, year 2008.

* cited by examiner

FOUR-TRANSISTOR PIXEL WITH CHARGE SHARING

CROSS-REFERENCE TO RELATED APPLICATIONS

This application claims the benefit of U.S. Provisional Patent Application 63/513,886, filed Jul. 16, 2023, whose disclosure is incorporated herein by reference.

FIELD OF THE DISCLOSURE

The present disclosure relates generally to imaging devices and, particularly, to systems and methods for extending the dynamic range of imaging devices.

BACKGROUND OF THE DISCLOSURE

The dynamic range of imaging devices is typically determined by the ratio between the maximum signal that a pixel can capture and the smallest signal that the sensor can detect.

U.S. Pat. No. 5,144,442 discloses a wide dynamic range video imaging apparatus, comprising a) a sensor for providing a plurality of video images of a scene at different exposure levels and b) a processor for processing the plurality of video images to produce a combined video image including image information from the plurality of video images by applying neighborhood transforms to the plurality of video images, the processor comprising a selector for locally selecting the operating levels of the dynamic range of the combined video image within the dynamic range of the sensor, whereby the resulting video image includes image information from the plurality of video images with enhanced information content at local areas therein.

U.S. Pat. No. 8,606,009 discloses techniques and tools for high dynamic range (HDR) image rendering and generation. An HDR image generating system performs motion analysis on a set of lower dynamic range (LDR) images and derives relative exposure levels for the images based on information obtained in the motion analysis. These relative exposure levels are used when integrating the LDR images to form an HDR image. An HDR image rendering system tone-maps sample values in an HDR image to a respective lower dynamic range value and calculates local contrast values.

Lastly, in "Wide-Dynamic-Range CMOS Imaging sensors—Comparative Performance Analysis", A. Spivak et. al (IEEE TRANSACTIONS ON ELECTRON DEVICES, VOL. 56, NO. 11, November 2009), the authors assert that a large variety of solutions for widening the dynamic range of CMOS imaging devices has been proposed, and then propose a set of criteria for a comparative analysis of the performance of wide-DR (WDR) sensors. The authors divide WDR sensors into seven categories, and then compare the sensors of the various categories based on the proposed comparative analysis criteria.

SUMMARY OF THE DISCLOSURE

An embodiment described herein provides an image sensor including a pixel-circuit and circuitry. The pixel-circuit includes a photodiode (PD) configured to accumulate electrical charge in response to incident light, a floating diffusion (FD) configured to temporarily store the electrical charge, and a sharing gate configured to connect the PD to the FD. The circuitry is configured to serially (i) connect the PD and a supply rail to the FD and send a first FD voltage, (ii) disconnect the supply rail from the FD and send a second FD voltage, (iii) disconnect the PD from the FD and send a third FD voltage, (iv) wait a preset exposure time, (v) connect the supply rail to the FD and send a fourth FD voltage, (vi) disconnect the supply rail from the FD and send a fifth FD voltage, and (vii) connect the PD to the FD and send a sixth FD voltage. The circuitry is further configured to estimate an incident light energy responsively to the first, second, third, fourth, fifth and sixth FD voltages, and to a capacitance ratio defined over at least capacitances of the FD and the PD.

In some embodiments, the circuitry is configured to store voltage differences between selected pairs of measured FD voltages, and to estimate the incident light energy responsively to the voltage differences. In an example embodiment, the circuitry includes a differential amplifier that is configured to calculate each of the voltage differences by storing a previously supplied FD voltage and subtracting a currently supplied FD voltage from the previously supplied FD voltage.

In a disclosed embodiment, the pixel circuit further includes a Lateral Overflow Integration Capacitor (LOFIC) configured to store excess electrical charge that is above a well capacity of the PD, and a LOFIC sharing gate configured to connect the LOFIC to the FD.

In an embodiment, the sharing gate includes a buried channel transistor. In an embodiment, the PD is partially non-depleted. In an embodiment, the circuitry is configured to estimate a capacitance ratio between nodes of the pixel circuit by injecting a calibration signal and measuring charges responsively to the injected signal, and to store a digital value according to the estimated capacitance ratio.

There is additionally provided, in accordance with an embodiment described herein, a method for imaging including accumulating electrical charge in a photodiode (PD) in response to incident light, and temporarily storing the electrical charge in a floating diffusion (FD). The following are performed serially: (i) connecting the PD and a supply rail to the FD and sending a first FD voltage, (ii) disconnecting the supply rail from the FD and sending a second FD voltage, (iii) disconnecting the PD from the FD and sending a third FD voltage, (iv) waiting a preset exposure time, (v) connecting the supply rail to the FD and sending a fourth FD voltage, (vi) disconnecting the supply rail from the FD and sending a fifth FD voltage, and (vii) connecting the PD to the FD and send a sixth FD voltage. An incident light energy is estimated responsively to (i) the first, second, third, fourth, fifth and sixth FD voltages, and (ii) a capacitance ratio defined over at least capacitances of the FD and the PD.

The present disclosure will be more fully understood from the following detailed description of the embodiments thereof, taken together with the drawings in which:

DETAILED DESCRIPTION OF EMBODIMENTS

Abbreviations

Figure 1:
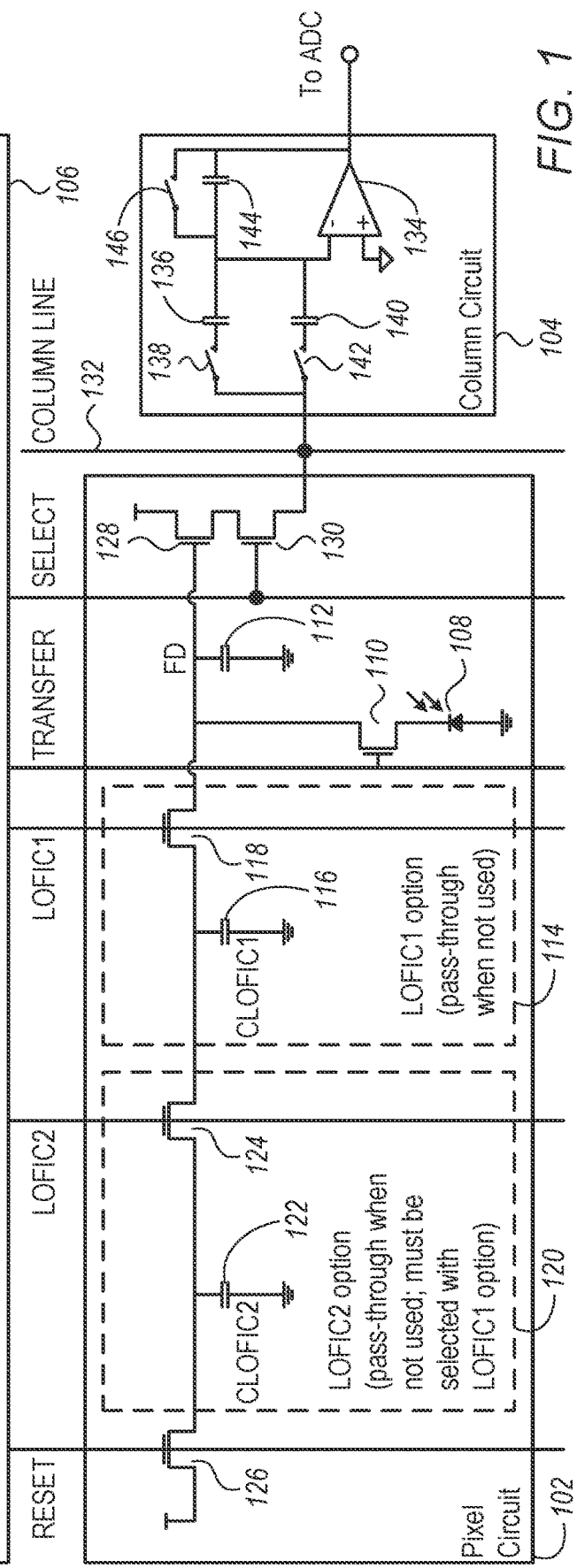
FIG. 1 is a block diagram that schematically illustrates an image sensor with charge sharing, in accordance with an embodiment that is described herein.

We will use hereinbelow the following abbreviations:
1. CMOS—Complementary Metal-Oxide Silicon.
2. NMOS—N-Type Metal-Oxide Silicon transistor (will also be referred to as Transistor).
3. PD—Photodiode.
4. FD—Floating Diffusion.
5. SF—Source Follower.
6. CDS—Correlated Double-Sampling.
7. LOFIC—Lateral Overflow Integration Capacitor.

Overview

Four-Transistor (4t) pixel circuits of a CMOS image sensor may comprise one or more PDs that are connected through respective Transfer transistors to a common FD, a Reset transistor that connects a positive supply rail to the FD, an SF amplifier that generates a low-impedance replica of the FD voltage, and a Select transistor, configured to send the replica of the FD voltage to a column line that is shared by a plurality of vertically aligned pixel circuits.

In a Reset Phase, the PD is reset by activating the Reset transistor and the Transfer transistor, thereby removing any accumulated electrons from the PD; then, in an Integration Phase, the Reset and Transfer transistors are turned off, and the photodiode accumulates charge responsively to incident light. Lastly, in a Readout Phase, the Transfer transistor and the Select transistor are turned on, the charge on the PD is transferred to the FD, and a replica of the FD voltage is transferred to the column line.

The dynamic range of an image sensor is typically defined as the ratio between the brightest and darkest signal that can be captured in a single image. In imagers comprising PDs, the darkest signal is derived from the PD noise with no illumination, whereas the brightest signal is typically derived from the PD's well capacity (or, in 4-t pixels, by the capacity of the floating diffusion).

Some commonly used High Dynamic Range (HDR) imaging technique include one or more of the following:
1. Multiple Exposure—capturing multiple images (e.g., two) of the same scene, each at a different exposure level, and then combining them to produce a single image with a wider dynamic range.
2. Full charge transfer of all (or almost all) the electrons accumulated in the PD to the FD, to reduce the noise level—this may be achieved by applying a relatively high voltage (e.g., 2.5V) and by using a fully depleted PIN photodiode.
3. Use of one or more LOFICs, which store overflow of electrons from the PD's well on local capacitors. The voltage on the capacitors can be read, scaled according to the capacitance ratio, and then added to the charge read from the PD.

The techniques described above have drawbacks in both performance and cost, including: (i) Multiple exposure is more complex, and may create motion artifacts; (ii) applying a high voltage to the Transfer transistor gate requires the supply of a relatively high voltage source to the image sensor; (iii) fully depleted Pinned PDs are more expensive to manufacture; and (iv) LOFICs are expensive to manufacture and to characterize.

Embodiments that are disclosed herein provide for systems and methods to accurately evaluate the charge accumulated in the PD without fully evacuating the electrons to the FD. Thus, high dynamic range images can be captured in low-voltage power supply image sensors, using PDs that are not fully depleted. In some embodiments, HDR can thus be achieved without multiple exposure, and hence, motion artifacts are eliminated; in other embodiments, HDR images can be achieved with a single LOFIC or with no LOFICs.

In a disclosed embodiment, the image sensor comprises a plurality of pixel circuits that include a Floating Diffusion (FD), a photodiode (PD), a Transfer Transistor that connects the PD to the FD, a Reset transistor that connects the FD to a positive supply rail, a Source Follower (SF) transistor that produces a low impedance replica of the FD voltage and a Select transistor that drive the FD replica on a column line that is shared by a column of pixel circuits. In embodiments, the Transfer Transistor does not Transfer the PD charge to the FD but, rather, causes charge sharing between the PD and the FD. We will sometimes refer, therefore, to the Transfer Transistor as a Sharing Gate.

The image sensor further comprises a plurality of column circuits that are configured to store column voltages, and to output a voltage that is equal to the difference between column line voltages in two separate samples, and an Analog to Digital Converter (ADC) that is configured to convert such differences that the column circuit outputs to digital, and store the digital representation of the differences in Random Access Memory (RAM).

In some embodiments, prior to light exposure, the image sensor, sequentially: (i) connects the PD and a positive supply rail to the FD and measures a first FD voltage (V1); (ii) disconnects the supply rail from the FD and measures a second FD voltage (V2); (iii) converts V2−V1 to digital and store the digital value in RAM; (iv) disconnects the supply rail and the PD from the FD and measures a third FD voltage (V3), (v) converts V3−V1 to digital and stores the digital value in RAM.

After the exposure, the image sensor, in some embodiments, sequentially: (i) connects the supply rail to the FD and measures a fourth FD voltage (V4); (ii) disconnects the supply rail from the FD and measures a fifth FD voltage (V5); (iii) converts V5−V4 to digital and stores the digital value in RAM; (iv) connects the PD to the FD and measures a sixth FD voltage (V6), (v) converts V6−V4 to digital and stores the digital value in RAM.

In some embodiment, the capacitance ratio $w\_4t = C_{total}/C_{fd}$ is preset (e.g., determined during calibration). The pixel value is calculated digitally according to: Vpixel=(w_4t*(V6−V4)−(V5−V4))−(w_4t*(V1−V3)−(V1−V2)).

In other embodiments that are disclosed herein, similar sequences are used where the pixel circuit comprises one or two LOFICs.

Thus, in embodiments, a relatively low cost high dynamic range image sensor that does not require fully-depleted photodiodes or high voltage on the transfer-transistor gate (and hence may use a low voltage supply such as 1.5V) is disclosed.

DESCRIPTION OF EMBODIMENTS

FIG. 1 is a block diagram that schematically illustrates an image sensor 100 with charge sharing, in accordance with an embodiment that is described herein. The image sensor comprises a matrix of pixel circuits 102, arranged in rows and columns (for clarity, only one pixel circuit is shown). Each column of pixel circuits sends a voltage reading to a Column Circuit 104 (only one column circuit is shown, for clarity); the pixel circuits and the column circuits are controlled by a Control Circuit 106.

In the present context, control circuit 106 and column circuit 104 are sometimes referred to jointly as "circuitry". In alternative embodiments, the circuitry may be implemented as a single circuit or it may be partitioned into any other suitable number of sub-circuits in any other way.

In some embodiments a column of pixel circuits may be split to two or more portions, and a separate column circuit may be connected to each portion. In other embodiments, a single column circuit may be connected to more than one column of pixel circuits, or to portions of more than one column. In yet other embodiments, Control Circuit 106 may comprise a plurality of circuits that are connected to groups of pixels circuits and/or group of column circuits.

Pixel Circuit 102 comprises a photodiode 108, which is connected through an NMOS transistor 110 to a floating diffusion (FD) 112 (the FD is represented, in FIG. 1, by an equivalent capacitor). An optional LOFIC1 circuit 114 may be used to store overflow charge of PD 108 in a capacitor CLOFIC1 116; an NMOS 118 connects CLOFIC1 116 to FD 112.

A second optional LOFIC2 circuit 120 may be used to store overflow charge of LOFIC1 116 in a capacitor LOFIC2 122; an NMOS 124 connects LOFIC2 122 to LOFIC1 116. LOFIC2 122 is connected, through a Reset NMOS 126, to a positive power supply (e.g., 1.5V).

It should be noted that both LOFIC1 circuit 114 and LOFIC2 circuit 120 are optional, and, when not in use, comprise a pass-through route from Reset transistor 126 to either LOFIC1 116 (if only LOFIC1 circuit is in use) or to FD 112 (if no LOFIC circuit is used).

Pixel circuit 102 further comprises a source-follower (SF) NMOS transistor 128, which is configured to send a replica of the voltage on the FD, through a Select Transistor 130, to a column line 132 that is shared by a plurality of pixel circuits placed in the same column.

Column Circuit 104 is configured to output (e.g., to an Analog to Digital Converter (ADC)) the differences between a first input voltage U1 and two subsequent input voltages U2 and U3: Uout1=U2−U1 and Uout2=U3−U1. The column circuit comprises a high gain operational amplifier 134 in a closed loop configuration; the positive input of the operational amplifier is connected to a reference-0 input, e.g., a regulated Vdd/2 source (other suitable voltages may be used in alternative embodiments, to optimize the operational amplifier performance); the negative input is connected to the column line through a first capacitor 136 in series with a switch 138, and through a second capacitor 140, in series with a switch 142. The feedback connection comprises a feedback capacitor 144, in parallel with a switch 146. In an embodiment, switches 138, 142 and 146 comprise NMOS transistors.

According to the example embodiment illustrated in FIG. 1, the column circuit may output voltage differences as follows (assuming capacitors 140, 136 and 144 have identical capacitances):

1. A first voltage U1 is applied at the input, switches 138, 142 and 146 are on; U1 is stored on both C140 and C136.
2. A second voltage U2 is applied at the input. Switches 142 and 146 are turned off, switch 138 remains on. To keep the voltage at the positive input at zero, the operational amplifier outputs a voltage Uout=U2−U1. The voltage on C136 is unchanged (U1).
3. Switches 138 and 142 are open, switch 146 is closed. C144 is discharged.
4. A third voltage U3 is applied at the input. Switch 138 is turned on, switches 142 and 146 are off. Uout=U3−U1.

It should be noted that, while C136 is typically equal to C140, C146 may have a different capacitance to implement a gain (e.g., Uout=(U2−U1)*C136/C146).

Note that the column circuit can also be used to store two voltages and then produce two differences (this will be utilized when LOFIC capacitors are added, as described below, with reference to FIG. 2):

| Input | S138 | S142 | S146 | Output | Note |
|-------|------|------|------|--------|------|
| V1 | ON | OFF | ON | 0 | C126 stores V1 |
| V2 | OFF | ON | ON | 0 | C142 stored V2 |
| V3 | ON | OFF | OFF | V1−V3 | |
| | OFF | OFF | ON | | Discharge C144 |
| V4 | OFF | ON | OFF | V2−V4 | |

In some disclosed embodiments, PD 108 may be a relatively inexpensive photodiode that is not fully depleted and retains some of its charge when NMOS 110 is turned on. NMOS 110, which will be sometimes referred to hereinbelow as Transfer Gate or Sharing Gate, is, in effect, a Shared-Charge transistor, allowing charge sharing between its drain and source rather than charge transfer.

The control circuit goes through a series of operations described hereinbelow, to allow an indirect measurement of the accumulated charge (assuming the optional LOFIC circuits 114 and 120 are not present, and reset NMOS transistor 126 is connected directly to the FD):

1. Turns on transistors 126, 110, to apply Reset to the PD and FD, and turns on transistor 130 to send a first voltage V1 to the column circuit.
2. Turns off transistor 126 (this operation injects charge into the FD), sends V2 to the column circuit, which, in turn, outputs V1−V2 to an ADC.
3. Turns transistor 110 off, redistributing the charge between the FD and the PD (the total charge is conserved); sends V3 to the column circuit, which now outputs V1−V3 to the ADC.
4. Turns transistor 130 off (so that other pixel circuits may send voltages over the common column line).
5. Waits Exposure time (light integration takes place).
6. Turns transistor 126 and 130 on (transistor 110 stays off); send V4 to the column circuit.
7. Turns transistor 126 off (this operation injects charge into the FD); sends V5 to the column circuit, which now outputs V4−V5 to the ADC.
8. Turns transistor 110 on (this operation redistributes the FD and PD charge); sends V6 to the column circuit, which will now output V4−V6 to the ADC.

After this sequence, the differences that were sent to the ADC are stored in memory:

$$Diff1 = V1 - V2$$
$$Diff2 = V1 - V3$$
$$Diff3 = V4 - V5$$
$$Diff4 = V4 - V6$$

the pixel value can now be calculated (digitally) according to the formula:

$$Vpixel = (w\_4t * Diff4 - Diff3) - (w\_4t * Diff2 - Diff1)$$

wherein w_4t is the capacitance ratio:

$$w\_4t = C_{total}/C_{fd}.$$

The configuration of image sensor 100, illustrated in FIG. 1 and described hereinabove, is cited by way of example. Other configurations may be used in alternative embodiments. For example, in an embodiment, the configuration of column circuit 104 is different and includes, for example, a capacitor that is connected to the positive input of the operational amplifier to store V1. In embodiments, other suitable configurations of operational amplifier 134, including capacitors 136, 140, 144 and switches 138, 142 and 146 can be used. Lastly, in some embodiments, photodiode 108 is an n-substrate P implant "hole accumulation" diode (this implies suitable polarity reversal in other devices and signal of the pixel circuit).

Figure 2:
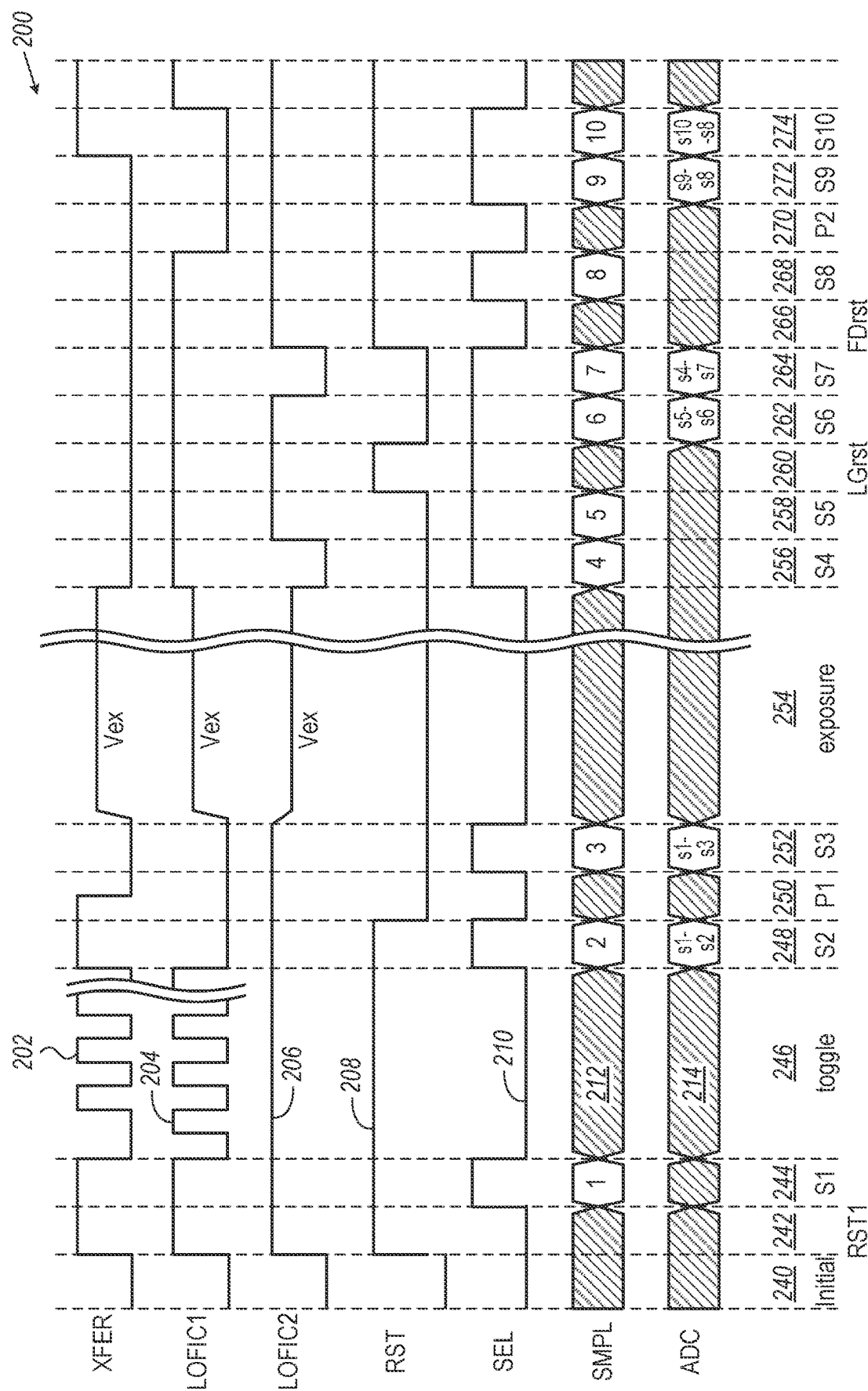
FIG. 2 is a timing diagram that schematically illustrates the waveforms of an image sensor with charge sharing, in accordance with an embodiment that is disclosed herein.

FIG. 2 is a timing diagram 200 that schematically illustrates the waveforms of an image sensor with charge sharing, in accordance with an embodiment that is disclosed herein. The waveforms refer to a pixel circuit comprising two LOFIC devices and include: a Transfer waveform 202 depicting the gate voltage of NMOS 110, a LOFIC1 waveform 204 depicting the gate voltage of NMOS 118, a LOFIC2 waveform 206 depicting the gate voltage of NMOS 124, a Reset waveform 208 depicting the gate voltage of NMOS 126, and a Select waveform 210 depicting the gate voltage of NMOS 130.

Waveforms 200 further comprises a Sample waveform 212, which counts signals that the column circuit 104 (FIG. 1) samples, and an ADC waveform 214, which shows the difference voltages output by column circuit 104 (FIG. 1) to the ADC.

At an initial Period 240 all signals are at logic low, in preparation for an image capture. Then, at a Reset1 Period 242, Transfer, LOFIC1, LOFIC2 and Reset turn high; this transition drains electrons from the PD and the FD to the positive supply. At a Sample-1 Period 244, Select 210 turns on, and a first sample S1 is stored in the column circuit (e.g., on capacitors 136 and 140, FIG. 1).

The pixel circuit now enters a Toggle Period 246, wherein Transfer 202 and LOFIC1 204 toggle. In an embodiment, the control circuit drives two non-overlapping pulse sequences on Transfer transistor 202 and LOFIC1 204; this compensates for LOFIC1 charge injection and for control feedthrough by distributing the charges on various parasitic capacitances (between the signals Transfer, LOFIC1 and floating diffusion FD) so that their state during samples S2 and S3 will be as close as possible to the state during S9 and S10.

Next, at a Sample-2 Period 248, Transfer 202 and Select 210 turn on; the column circuit subtracts the voltage on the column line (designated S2) from S1, and the difference S1−S2 is sent to the ADC, converted to Digital and stored in digital memory. The difference S1−S2 is the total charge of the reset sample ($Q_{total}$-rst).

After taking sample S2, at a Pause-1 Period 250, Select 210, LOFIC2 204 and Reset 208 turn low; shortly afterwards Transfer 202 turns low, causing charge redistribution. Then, at a Sample-3 period 252 (after the voltages converge), Select 210 turns high, and column circuit samples S3 on the column lines and outputs the difference S1−S3 to the ADC. S1−S3 is the $Q_{fd}$-reset sample.

This concludes the pre-exposure steps that the image sensor takes. After Period 252 the differences S1−S2 and S1−S3 are stored in memory and will be used to calculate the final pixel value.

The exposure takes place at an Exposure Period 254. Select 210 is turned off, Transfer 202, LOFIC1 204 and LOFIC2 206 assume preset voltage levels which may be optimized according to the selected silicon process parameters, so that a minimum amount of charge will leak from the PD. In an embodiment, the preset voltage levels are optimized so that the energy barriers of the three MOS devices are aligned, making sure that the lateral overflow from the photodiode to floating diffusion and then to the first and second LOFIC capacitors occurs in the desired direction and no reverse flow is possible.

After the exposure and prior to reading the charge that is stored in the PD, LOFIC1, LOFIC2 and the reset values are evaluated: at a Sample-4 Period 256, Select is high, and the column circuit samples S4 (the overflow charge that has accumulated on the floating diffusion and on Clofic1) on the column line. The column circuit stores S4 on C136.

Then, at a Sample-5 Period 258, LOFIC2 turns high, and the column circuit samples S5 (the charge that has accumulated on the FD, CLOFIC1 and CLOFIC2) on the column line. The column circuit stores S5 is stored, e.g., on capacitor C140.

At a Low-Gain-reset period 260, Reset turns on and a reset voltage propagates to LOFIC2 capacitor, LOFIC1 capacitor and the FD. Next, at a Sample-6 Period 262, Reset turns low, causing signal feedthrough and charge injection. Thereafter the column circuit samples the reset voltage (S6) on the column line and sends a difference S6−S5, referred to as the low-gain (LOFIC2) signal, to the ADC and thence to the memory.

Now, in a Sample-7 Period 264, LOIFC2 turns low, the column circuit samples the reset value of the medium gain (S7) on the column line, and sends the difference S4−S7, (referred to as mid-gain signal), to the ADC and thence to the memory.

At an FD-reset Period 266, LOFIC2 and Reset turn high, an Select turns low, resetting the FD. Then, at a Sample-8 period 268, Sample turns high, and the column circuit samples S8 on the column line, and stores the sample on both capacitors 136 and 140.

At a Pause-2 period 270, Select 210 and LOFIC1 204 turn low, producing signal feedthrough and charge injection. Thereafter, at a Sample-9 period 272, Select 210 turns high, the column circuit samples FD reset voltage (S9) on the column line and sends the difference S9−S8 to the ADC (the difference is stored in memory).

Lastly, at a Sample-10 period 274, Transfer 202 turns high, redistributing the charge on the PD and the FD; the column circuit samples the voltage V10 on the column line and sends the difference S10–S8 to the ADC.

The configuration of timing diagram 200 illustrated in FIG. 2 and described hereinabove is simplified and cited by way of example. Other timing diagrams may be used in alternative embodiments. For example, in some embodiments some of the time periods may be longer than others; in embodiments, various transitions of signals which, according to FIG. 2, seem to take place at the same time, are separated. In an embodiment, there is only one LOFIC device, and the waveforms change accordingly. In other embodiments more than two LOFIC stages may be used. In some embodiments, DDS may be used, wherein the low and medium gain readouts are calculated by performing S5–S6 respectively S4–S7 in the digital domain.

We refer below to the charge stored in the PD as High-Gain charge, to the charge stored in LOFIC1 and the FD as Mid-Gain charge, and to the charge stored in LOFIC2, CLOFIC1 and FD as Low-Gain charge.

Figure 3:
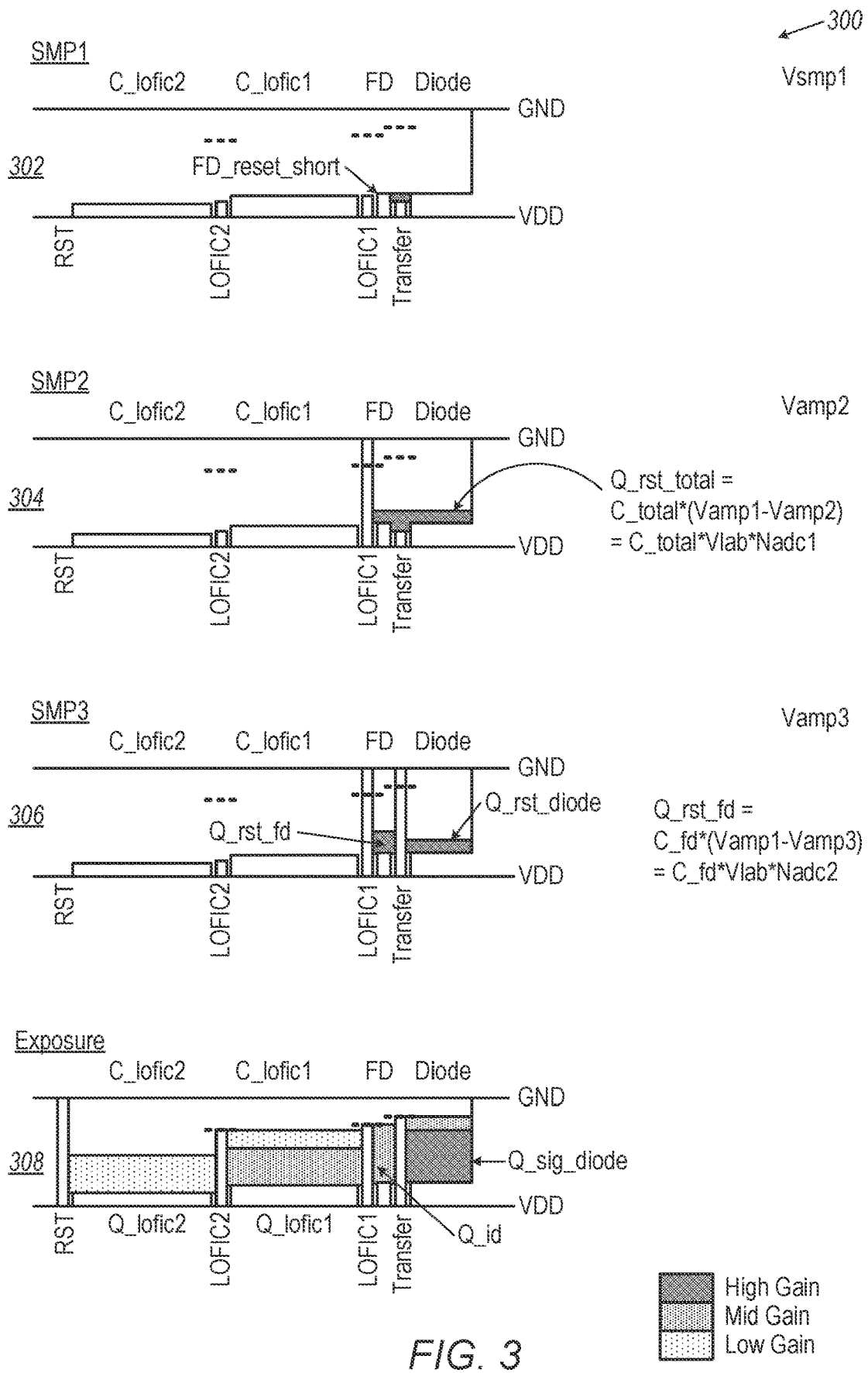
FIG. 3 is an energy chart that schematically illustrates the energy levels of pixel circuit elements during various reset phases, in accordance with an embodiment that is disclosed herein.

FIG. 3 is an energy chart 300 that schematically illustrates the energy levels of pixel circuit elements during various reset phases, in accordance with an embodiment that is disclosed herein.

1. A diagram 302 illustrates the energy levels at S1 period 244 (FIG. 2)—the transistors are closed (on), but a small amount of electrons remains.
2. A diagram 304 illustrates the energy levels at S2 period 248—Transfer gate 110 is closed (on) and LOFIC1 118 is open (Off). Charge is injected into Ctotal, (Ctotal includes the capacitances of the PD, the FD, and additional capacitance associated with the channel of the Transfer device). The total reset charge is $Q_{rst}$–total=Ctotal*(V1–V2). The corresponding voltage difference (V1–V2) is converted to digital and stored in RAM.
3. A diagram 306 illustrates the energy levels at S3 period 252. LOFIC1 Transistor 118 remains open (off), and now Transfer gate 110 is also off (since P1 period 250). The FD reset charge is: $Q_{rst}$–FD=$C_{FD}$*(V1–V3). The corresponding voltage difference (V1–V3) is converted to digital and stored in RAM.
4. A diagram 308 illustrates the energy levels at Exposure period 254. All transistors are open; charge accumulates in the PD and may overflow to LOFIC 1 and, sometimes, to LOFIC 2.

Figure 4:
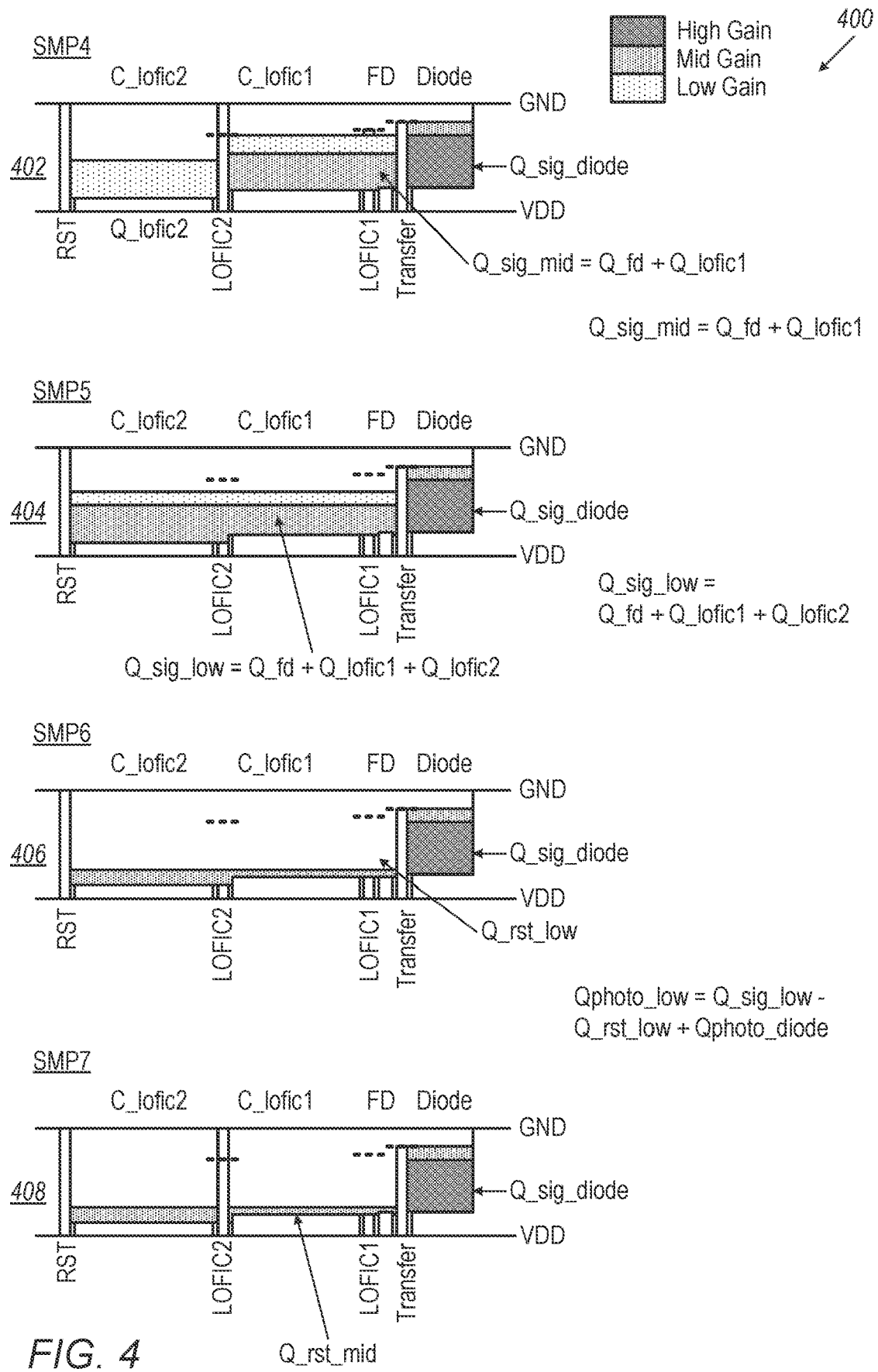
FIG. 4 is an energy chart that schematically illustrates the energy levels of pixel circuit elements during various post-exposure mid and low gain readout phases, in accordance with an embodiment that is disclosed herein.

FIG. 4 is an energy chart 400 that schematically illustrates the energy levels of pixel circuit elements during various post-exposure mid and low gain readout phases, in accordance with an embodiment that is disclosed herein.

1. A diagram 402 illustrates the energy levels at S4 period 256 (FIG. 2). LOFIC1 118 (FIG. 1) is closed (on); all other transistors are off. The mid-gain LOFIC1 charge is:
$Q_{sig}$–mid=$Q_{FD}$+$Q_{LOFIC1}$=($C_{FD}$+$C_{LOFIC1}$)*(V4–V7). The corresponding voltage difference (V4–V7) is stored in RAM.
2. A diagram 404 illustrates the energy levels at S5 period 258 (FIG. 2). LOFIC1 118 and LOFIC2 are closed (on); Reset NMOS 126 and Transfer NMOS 110 are open (off). The low-gain LOFIC2 charge is:
$Q_{sig}$–low=$Q_{FD}$+$Q_{LOFIC1}$+$Q_{LOFIC2}$=($C_{FD}$+$C_{LOFIC1}$+$C_{LOFIC2}$)*(V5–V6). The corresponding voltage difference (V5–V6) is stored in RAM.
3. A diagram 406 illustrates the energy levels at S6 period 262 (FIG. 2) (Reset period 260 preceded S6). Reset NMOS 126 and Transfer NMOS 110 are open (off). The low-gain reset charge is:

$$Q_{rst}\text{–low} = (C_{FD} + C_{LOFIC1} + C_{LOFIC2})*(V5 - V6).$$

The corresponding voltage difference (V5–V6) is stored in RAM.
4. A diagram 408 illustrates the energy levels at S7 period 264 (FIG. 2). LOFIC2 now turns off (open). Reset NMOS 126, and Transfer NMOS 110 remains open (off), and LOFIC1 remains closed (on). The mid-gain reset charge is:

$$Q_{rst}\text{–mid} = (C_{FD} + C_{LOFIC1})*(V4 - V7).$$

The corresponding voltage difference (V4–V7) is stored in RAM. At this stage all data needed to evaluate the mid-gain pixel level is stored in memory:

$$Q_{pixel}\text{–mid} =$$
$$Q_{sig}\text{–mid} - Q_{rst}\text{–mid} + Q_{PD} = (CFD + CLOFIC1)*(V4 - V7) + Q_{PD}.$$

Figure 5:
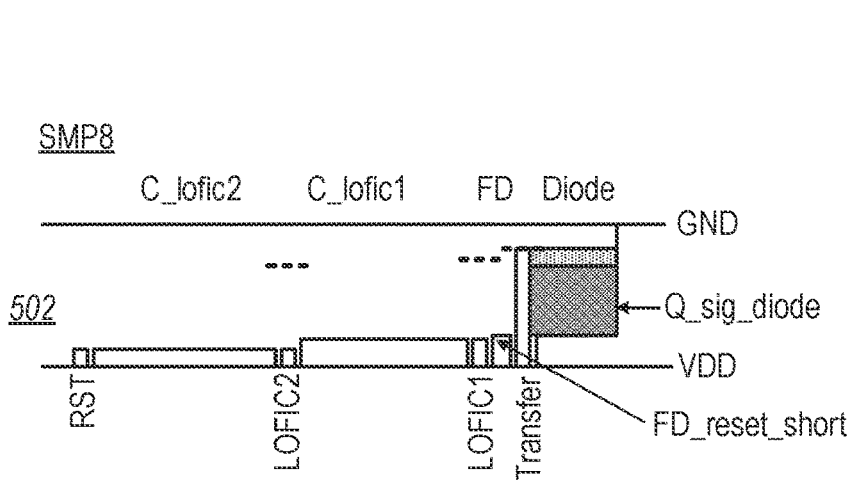
FIG. 5 is an energy chart that schematically illustrates the energy levels of pixel circuit elements during various post-exposure high gain readout phases, in accordance with an embodiment that is disclosed herein.
Figure 5:
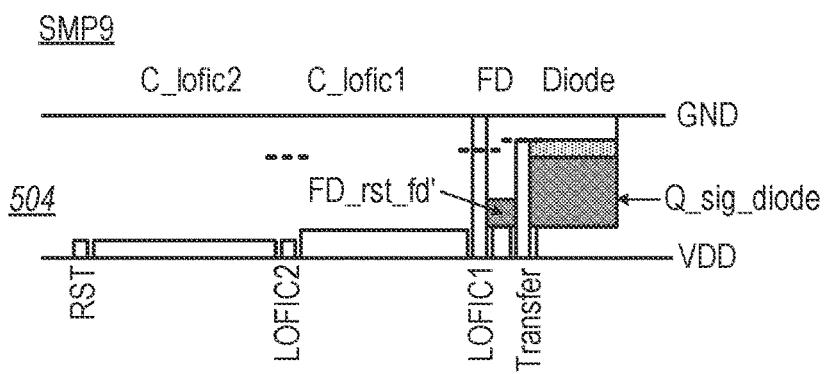
Figure 5:
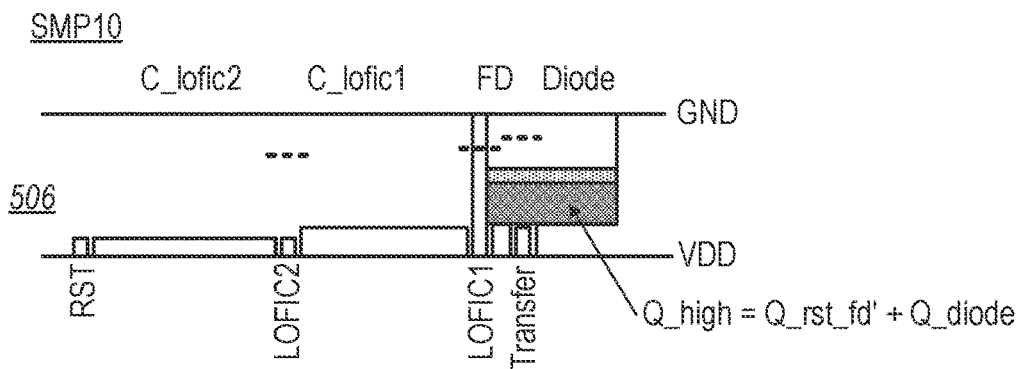
Figure 5:

FIG. 5 is an energy chart 500 that schematically illustrates the energy levels of pixel circuit elements during various post-exposure high gain readout phases, in accordance with an embodiment that is disclosed herein.

1. A diagram 502 illustrates the energy levels at FDrst period 266 and S8 period 268 (FIG. 2). Reset NMOS 126, LOFIC2 124 and LOFIC1 116 are closed (on), whereas Transfer NMOS 110 remains open (off), retaining the PD charge. V8 is sampled and stored (on capacitors C136 and C138) in the pixel circuit.
2. A diagram 504 illustrates the energy levels at S9 period 272 (FIG. 2). LOFIC1 is turned off, and, as a result, some charge is injected into the FD. The charge at the PD and FD is:
Qrst–FD'=CFD*(V9–V8). The corresponding voltage difference (V9–V8) is stored in RAM.
3. A diagram 506 illustrates the energy levels at S10 period 274 (FIG. 2). Transfer NMOS 110 is now closed (on), and the accumulated PD charge and the FD reset charge are redistributed. The charge is $Q_{sig}$–low=$Q_{rst}$–FD'+$Q_{PD}$=$C_{total}$*(V10–V8). The corresponding voltage difference (V10–V8) is stored in RAM. At this stage all data needed to evaluate the high-gain pixel level is in memory.

Energy charts 300, 400 and 500, illustrated in FIGS. 3, 4 and 5 are cited by way of example. Other energy charts may be used in alternative embodiments.

Digital Domain Processing

The voltage differences that were stored in memory during the exposure are digitally processed to calculate a high dynamic range low-noise pixel value.

We define capacitance ratios:

$$w\_4t = C_{total}/C_{fd}$$
$$w\_lofic1 = (C_{fd} + C_{lofic1})/C_{fd}$$
$$w\_lofic2 = (C_{fd} + C_{lofic1} + C_{lofic2})/C_{fd}$$

we now calculate:
high-gain signal:

$$N_{hg} = (w\_4t*(S8 - S10) - (S8 - S9)) - (w\_4t*(S1 - S2) - (S1 - S3))$$

medium-gain signal:

$$N_{mg} = w\_lofic1 * (S4 - S7)$$

low-gain signal:

$$N_{lg} = w\_lofic2 * (S5 - S6)$$

and:

$$\text{Pixel\_value} = \alpha * N_{hg} + \beta * N_{mg} + \gamma * N_{lg}$$

where α, β and γ are determined according to the values of the high gain and mid gain signals so as to minimize the expected noise.

Calibration

We will describe hereinbelow a calibration method for Ctotal/Cfd. In embodiments, similar methods may be used for the calibration of (Cfd+C_lofic1)/Cfd and the calibration of (Cfd+Clofic1+Clofic2)/Cfd.

In an embodiment, reset noise charge is a product of capacitance and voltage:

$$Q_{n\_total} = V_{fd} * (C_{fd} + C_{sg} + C_{pd})$$
$$Q_{n\_fd} = V_{fd} * C_{fd}$$

where Csg is the channel capacitance of the transfer gate. To calculate the charge, the ratio $$C_{fd}/(C_{fd} + C_{sg} + C_{pd})$$

is needed.

Pixel calibration measures the ratio. In some embodiments the calibration runs on startup or once per frame. In other embodiments the calibration is done once, e.g., in the production final test of the image sensor. The ratio is stored in a register or in the RAM.

In an embodiment, a calibration signal is injected through a small parasitic coupling. The LOFIC2 and/or reset transistors are switched from ground to Vdd. The switching shifts $V_{fd}$ by a small amount (typically 10 mV). $V_{fd}$ voltage swing is set responsively to the level of the transfer NMOS gate:

If the transfer gate is off, delta_$V_{fd}$_1 is a function of $C_{fd}$
If the transfer gate is on, delta_$V_{fd}$_2 is a function of $C_{fd}+C_{sg}+C_{pd}$
delta_$V_{fd}$_1/delta_$V_{fd}$_2 equals to $C_{fd}/(C_{fd}+C_{sg}+C_{pd})$ The calibration result is averaged over a few pixel circuit rows and the average is stored.

Figure 6:
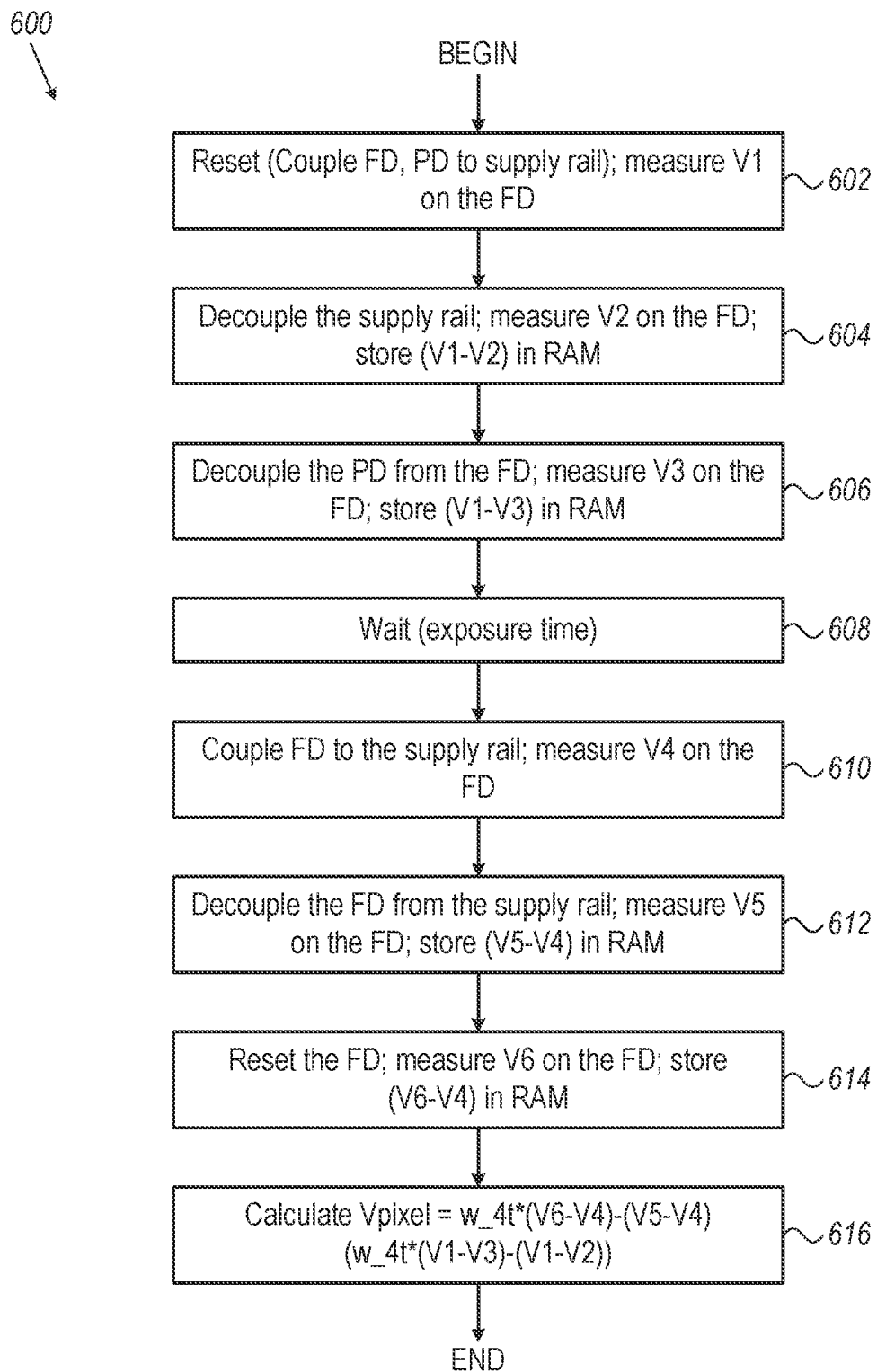
FIG. 6 is a flowchart that schematically illustrates a method for dynamic range extension, in accordance with an embodiment that is disclosed herein.

FIG. 6 is a flowchart 600 that schematically illustrates a method for dynamic range extension, in accordance with an embodiment that is disclosed herein. The flowchart is executed by control circuit 106, pixel circuit 102, column circuit 104, an ADC and a digital processor. (Flowchart 600 refers to a pixel circuit with no LOFIC.)

The flowchart starts at a Reset operation 602, wherein the FD 112 is connected, through Reset NMOS 126, to a positive power rail and, through a Select NMOS 110, to PD 108. This operation evicts electrons from the PD and the FD to the power supply. The voltage on the FD is sampled in the column circuit (stored on capacitors 136 and 140).

Next, at a Measure-V2 operation 604, the control circuit disconnects Reset NMOS 126; this injects charge into the FD. The column line assumes the voltage on the FD (V2); the column circuit outputs V1–V2 to the ADC, which converts the difference to a digital value that is stored in the RAM.

Now, at a Measure-V3 operation 606, the control circuit disconnects the FD from the PD (by turning NMOS 110 off). The column line assumes the voltage on the FD (V3); the column circuit outputs V1–V3 to the ADC, which converts the difference to a digital value that is stored in the RAM.

The flowchart now enters an Exposure operation 608, wherein no control is changed; the photodiode converts incident light to electrons that re stored in the PD's well.

After a preset time (according to an exposure setting), the flowchart enters a Measure-V4 operation 610, wherein the control circuit turns NMOS 126 on, connecting the FD to the supply rail; the column circuit stores the voltage on the FD (V4) in capacitors 136 and 140 (FIG. 1).

Next, at a Measure-V5 operation 612, the control circuit turns reset NMOS 126 off, disconnecting the FD from the power rail. The column line assumes the voltage on the FD (V5); the column circuit outputs V5–V4 to the ADC, which converts the difference to a digital value that is stored in the RAM.

Now, at a Measure-V6 operation 614, the control circuit turns Transfer NMOS 110 on, connecting the PD to the FD. The column line assumes the voltage on the FD (V6); the column circuit outputs V6–V4 to the ADC, which converts the difference to a digital value that is stored in the RAM.

At this point, all measurements are done. The flowchart enters a Calculate Pixel-Value operation 616 and calculates the pixel value (PV) according to the formula:

$$PV = w\_4t*(V6 - V4) - (V5 - V4) - (w\_4t*(V1 - V3) - (V1 - V2)).$$

The flowchart illustrated in FIG. 6 and described hereinabove is an example that is cited merely for the sake of conceptual clarity. Other configurations may be used in alternative embodiments. For example, in some embodiments, one or more LOFIC devices are used, and the flowchart expands, adding operations to evaluate the reset and signal values of the LOFIC capacitors.

The configuration of image sensor 100, including pixel circuit 102 and column circuit 104 and all subunits thereof, as well as flowchart 300 and timing diagram 200, are example configurations flowchart and waveforms that are shown purely for the sake of conceptual clarity. Any other suitable configurations, waveforms and SNR charts can be used in alternative embodiments, including, for example, single wafer circuits, circuits that do not include analog to digital conversions, and others.

Although the embodiments described herein mainly address 4-t image sensors, the techniques described herein can also be used in other applications, such as in 5T or 6T global shutter pixels.

Figure 7:
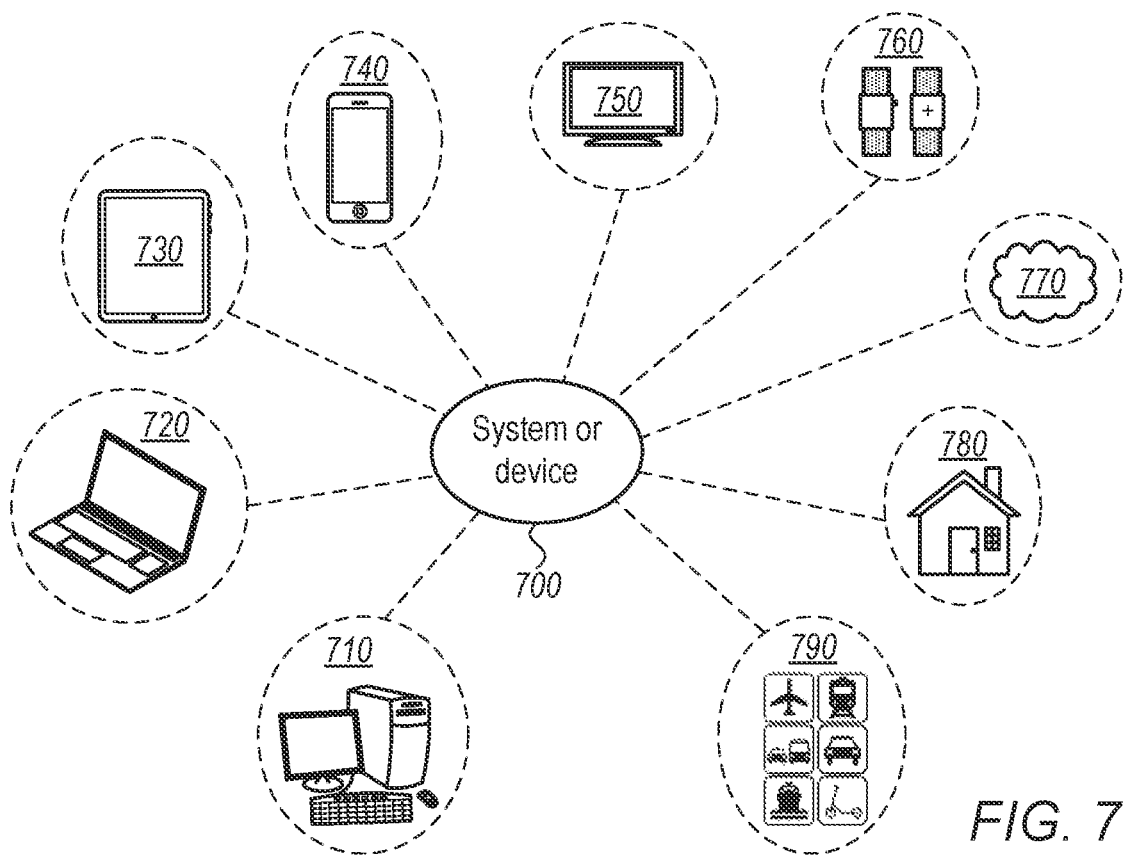
FIG. 7 is a diagram that schematically illustrates various types of systems that may include any of the circuits, devices, or system discussed above, in accordance with embodiments that are described herein.

FIG. 7 is a diagram 700 that schematically illustrates various types of systems that may include any of the circuits, devices, or system discussed above, in accordance with embodiments that are described herein. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions, for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 740 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
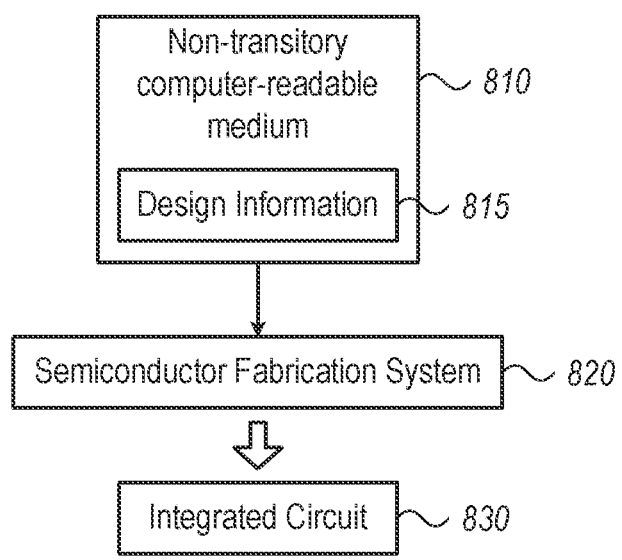
FIG. 8 is a block diagram illustrating an example non-transitory computer-readable storage medium that stores circuit design information, according to some embodiments that are described herein.

FIG. 8 is a block diagram illustrating an example non-transitory computer-readable storage medium that stores circuit design information, according to some embodiments that are described herein. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may include any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1 through 11. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An image sensor, comprising:
a pixel-circuit comprising:
 a photodiode (PD) configured to accumulate electrical charge in response to incident light;
 a floating diffusion (FD) configured to temporarily store the electrical charge; and
 a sharing gate configured to connect the PD to the FD; and
circuitry, configured to serially:
 connect the PD and a supply rail to the FD and send a first FD voltage;
 disconnect the supply rail from the FD and send a second FD voltage;
 disconnect the PD from the FD and send a third FD voltage;
 wait a preset exposure time;
 connect the supply rail to the FD and send a fourth FD voltage;
 disconnect the supply rail from the FD and send a fifth FD voltage; and
 connect the PD to the FD and send a sixth FD voltage,
 the circuitry being further configured to estimate an incident light energy responsively to (i) the first, second, third, fourth, fifth and sixth FD voltages, and (ii) a capacitance ratio defined over at least capacitances of the FD and the PD.

2. The image sensor according to claim 1, wherein the circuitry is configured to store voltage differences between selected pairs of measured FD voltages, and to estimate the incident light energy responsively to the voltage differences.

3. The image sensor according to claim 2, wherein the circuitry comprises a differential amplifier that is configured to calculate each of the voltage differences by storing a previously supplied FD voltage and subtracting a currently supplied FD voltage from the previously supplied FD voltage.

4. The image sensor according to claim 1, wherein the pixel circuit further comprises a Lateral Overflow Integration Capacitor (LOFIC) configured to store excess electrical charge that is above a well capacity of the PD, and a LOFIC sharing gate configured to connect the LOFIC to the FD.

5. The image sensor according to claim 1, wherein the sharing gate comprises a buried channel transistor.

6. The image sensor according to claim 1, wherein the PD is partially non-depleted.

7. The image sensor according to claim 1, wherein the circuitry is configured to estimate a capacitance ratio between nodes of the pixel circuit by injecting a calibration signal and measuring charges responsively to the injected signal, and to store a digital value according to the estimated capacitance ratio.

8. A method for imaging, comprising:
accumulating electrical charge in a photodiode (PD) in response to incident light;
temporarily storing the electrical charge in a floating diffusion (FD);
serially (i) connecting the PD and a supply rail to the FD and sending a first FD voltage, (ii) disconnecting the supply rail from the FD and sending a second FD voltage, (iii) disconnecting the PD from the FD and sending a third FD voltage, (iv) waiting a preset exposure time, (v) connecting the supply rail to the FD and sending a fourth FD voltage, (vi) disconnecting the supply rail from the FD and sending a fifth FD voltage, and (vii) connecting the PD to the FD and send a sixth FD voltage; and
estimating an incident light energy responsively to (i) the first, second, third, fourth, fifth and sixth FD voltages, and (ii) a capacitance ratio defined over at least capacitances of the FD and the PD.

9. The method according to claim 8, wherein estimating the incident light energy comprises storing voltage differences between selected pairs of measured FD voltages, and estimating the incident light energy responsively to the voltage differences.

10. The method according to claim 9, wherein storing the voltage differences comprises, using a differential amplifier, calculating each of the voltage differences by storing a previously supplied FD voltage and subtracting a currently supplied FD voltage from the previously supplied FD voltage.

11. The method according to claim 8, further comprising storing excess electrical charge, which is above a well capacity of the PD, in a Lateral Overflow Integration Capacitor (LOFIC), and connecting the LOFIC to the FD using a LOFIC sharing gate.

12. The method according to claim 8, wherein connecting the PD to the FD is performed by a buried channel transistor.

13. The method according to claim 8, wherein the PD is partially non-depleted.

14. The method according to claim 8, further comprising estimating a capacitance ratio between nodes of a pixel circuit comprising the PD and the FD, by injecting a calibration signal and measuring charges responsively to the injected signal, and storing a digital value according to the estimated capacitance ratio.

* * * * *